(12) United States Patent
Nishiyama

(10) Patent No.: US 7,332,702 B2
(45) Date of Patent: Feb. 19, 2008

(54) OPTICAL RECEIVER AND A METHOD FOR MANUFACTURING THE SAME

(75) Inventor: Naoki Nishiyama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 663 days.

(21) Appl. No.: 10/633,588

(22) Filed: Aug. 5, 2003

(65) Prior Publication Data

US 2004/0079866 A1 Apr. 29, 2004

(30) Foreign Application Priority Data

Aug. 5, 2002 (JP) ............................. 2002-227443
Aug. 8, 2002 (JP) ............................. 2002-231923

(51) Int. Cl.
*H01J 40/14* (2006.01)
*H01L 3/00* (2006.01)

(52) U.S. Cl. ............................ 250/214 C; 250/214 R; 327/34

(58) Field of Classification Search ............ 250/214 R, 250/214 C, 214 AG, 214.1; 327/34
See application file for complete search history.

(56) References Cited

U.S. PATENT DOCUMENTS

| 4,153,835 A | * | 5/1979 | Lau et al. ................ 250/214 C |
| 5,278,404 A | | 1/1994 | Yeates |
| 5,548,112 A | * | 8/1996 | Nakase et al. .......... 250/214 C |
| 5,625,181 A | * | 4/1997 | Yasuda et al. .......... 250/214 A |
| 6,157,022 A | * | 12/2000 | Maeda et al. ........... 250/214 R |
| 6,188,059 B1 | * | 2/2001 | Nishiyama et al. ..... 250/214 R |
| 6,476,716 B1 | | 11/2002 | Ledlow |

FOREIGN PATENT DOCUMENTS

| JP | 06-164499 | 6/1994 |
| JP | 06-209290 | 7/1994 |
| JP | 11-205249 | 7/1999 |
| JP | 11-284445 | 10/1999 |
| JP | 2000-201031 | 7/2000 |
| JP | 2002-084235 | 3/2002 |
| JP | 2002-158370 | 5/2002 |

OTHER PUBLICATIONS

DS1851, "Dual Temperature-Controlled NV Digital-to-Analog Converters", pp. 1-17.

(Continued)

*Primary Examiner*—John R. Lee
(74) *Attorney, Agent, or Firm*—McDermott Will & Emery LLP

(57) ABSTRACT

This invention provides an optical receiver, a temperature dependence of which is compensated, and a method for manufacturing the optical receiver. The optical receiver according to the present invention comprises an avalanche photodiode (APD), a voltage source for supplying a bias voltage to the APD and a controller for feedback-controlling the bias voltage based on the monitored temperature of the APD. The input of the controller changes as the temperature of the APD varies, such that the bias voltage to the APD compensates the temperature dependence thereof. One aspect of the invention is that the reference input to the controller depends on the temperature, while another aspect of the invention is that the dividing ratio of the bias voltage changes as the temperature of the APD varies.

14 Claims, 3 Drawing Sheets

OTHER PUBLICATIONS

DS1848, "Dual Temperature-Controlled NV Variable Resistor & Memory", pp. 1-17.

Japanese Office Action issued in corresponding Japanese Patent Application No. JP 2002-227443. dated Jun. 26, 2007.

Japanese Office Action with English translation issued in corresponding Japanese Patent Application No. 2002-227443, dated Jan. 12, 2007.

* cited by examiner

OPTICAL RECEIVER AND A METHOD FOR MANUFACTURING THE SAME

FIELD OF THE INVENTION

This invention relates to an optical receiver and an optical transceiver having an avalanche photodiode (APD), especially a configuration for controlling a bias voltage supplied to the APD.

RELATED PRIOR ART

In an optical communication system, the APD is used as a light-receiving device. The APD is usable device for the fiber optic communication system that transmits a faint optical signal because the APD has a function to amplify carriers generated by the optical-to-electrical conversion. A degree of amplification is called as the multiplication factor of the APD.

On the other hand, the multiplication factor of the APD changes as temperature changes. Japanese patent laid open HEI 11-284445 discloses a technique to change the bias voltage supplied to the APD as temperature changes in order to suppress the temperature dependence of the multiplication factor. The specification of this Japanese patent discloses that a circuit comprises transistors and diodes that compensate some temperature dependence of the APD.

However, this circuit in the specification does not sense temperatures at all. Since temperature dependence of devices is solely utilized, the function of the circuit fully depends on characteristics of devices, thereby performance of the circuit is restricted. Moreover, since the characteristic to temperatures varies in respective devices, a variable resister, the resistance of which is manually adjusted, must be used to compensate the unevenness of devices.

SUMMARY OF THE INVENTION

An object of the present invention is to provide an optical receiver, in which an avalanche photodiode (APD) is included therein and a bias voltage supplied to the APD is controlled such that the multiplication factor of the APD is kept substantially constant to temperatures. The optical receiver according to the present invention comprises an avalanche photodiode, a voltage source for supplying a bias voltage to the avalanche photodiode and a temperature sensor for monitoring a temperature of the avalanche photodiode. The multiplication factor of the APD is kept substantially constant by adjusting the bias voltage based on the temperature monitored by the temperature sensor.

The optical receiver of the present invention may further include a controller for controlling the voltage source and a reference generator for outputting a reference voltage to the controller. The temperature sensor is preferably integrated in the reference generator because of the compactness of the receiver.

The optical receiver of the present invention may further include a register and a digital-to-analog converter. The register stores a relation between the reference voltage and the temperature in a digital form. The reference generator retrieves the register by indexing the temperature and converts the retrieved reference voltage into an analog form by the digital-to-analog converter to the controller and outputs the converted reference voltage to the controller. The reference generator may include a digital interface for setting the reference voltage and the temperature into the register.

The optical receiver of the present invention may include a voltage divider for dividing the bias voltage and outputting a divided voltage to the controller. The voltage divider may include a variable resistor having a resistance controlled by the temperature sensor. The temperature sensor may be integrated in the variable resistor. The variable resistor may further include a register for storing resistance values corresponding to temperatures. The variable resistor retrieves a resistance value from the register based on the temperature monitored by the temperature sensor.

Another aspect of the present invention relates to a method for manufacturing an optical receiver that includes an avalanche photodiode having a multiplication factor, a temperature sensor, a voltage source for supplying a bias voltage to the avalanche photodiode, a controller for controlling the bias voltage and a reference generator. The reference generator provides a reference voltage based on the temperature monitored by the temperature sensor to the controller. The controller controls the voltage source based on a comparison of the bias voltage to the reference voltage so as to keep the multiplication factor substantially constant to temperatures. The method for manufacturing may comprise the steps of (a) measuring reference voltages in at least two specific temperatures so as to maintain an output of the avalanche photodiode substantially constant; and (b) calculating reference voltages corresponding to temperatures except for the specific temperature based on the measured reference voltage. The optical receiver may include a register for storing data that relates the reference voltage to the temperature. The method, subsequently to the calculation of reference voltages, may comprise the step of setting the measured reference voltage and the calculated reference voltage with corresponding temperatures into the register.

The optical receiver may include a voltage divider for dividing the bias voltage by a variable resistor based on the temperature monitored by the temperature sensor. The method may comprise the steps of (a) measuring resistance values of the variable resistor in at least two specific temperatures so as to maintain an output of the avalanche photodiode substantially constant; and (b) calculating resistance values corresponding to temperatures except for the specific temperature based on the measured resistance value of the variable resistor. The variable resistor may include a register for storing resistance values and the corresponding temperatures. The method, subsequently to the calculation of resistance values, may comprise the step of setting the measured resistance values and the calculated resistance values with corresponding temperatures into the register.

DETAILED DESCRIPTION OF THE PREFERRED EMBODIMENT

Figure 1:
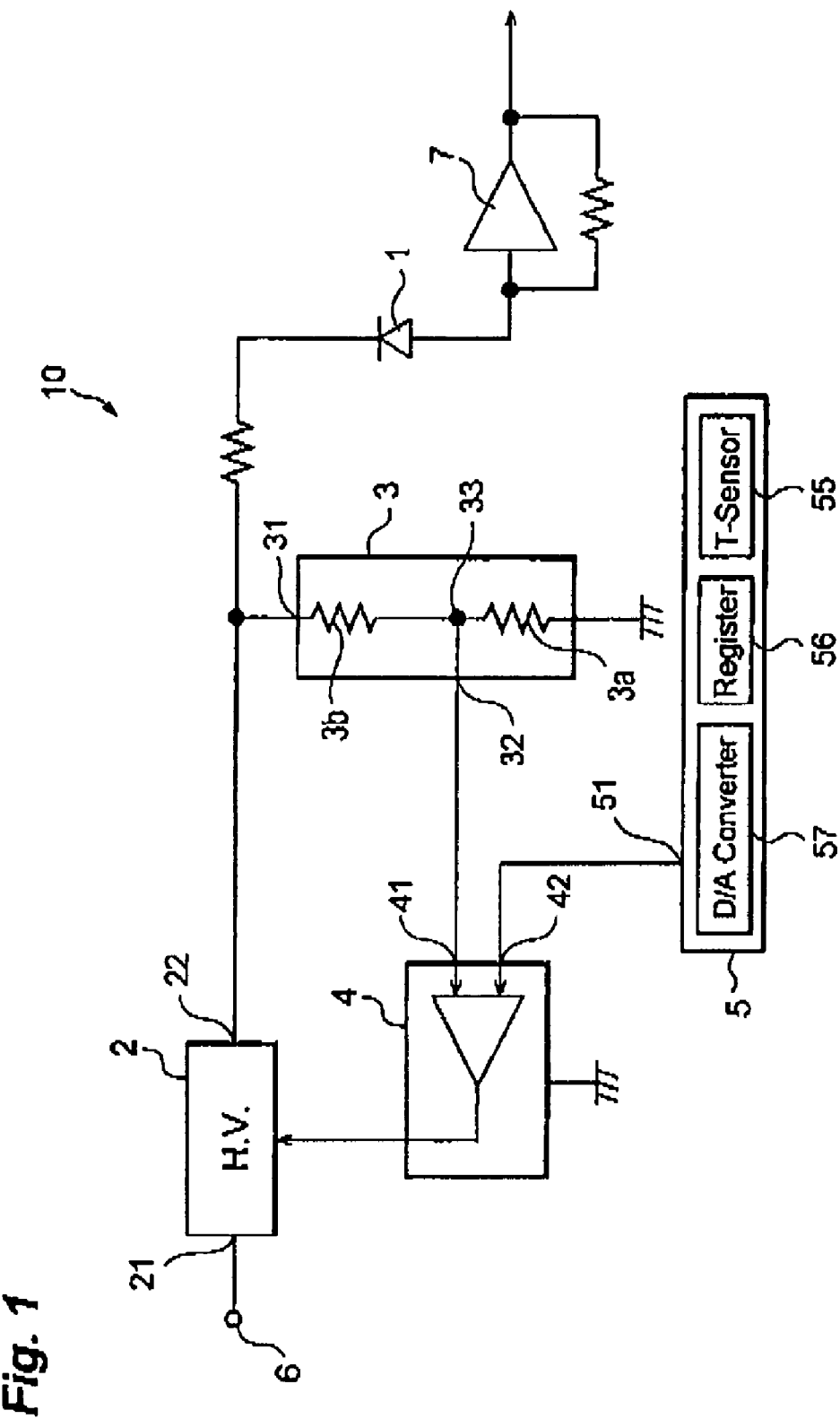
FIG. 1 shows a block diagram of the optical receiver according to the first embodiment of the invention.

The preferred embodiments of the present invention will be described. In the drawings, elements identical to each other will be referred to with numerals identical to each other without overlapping explanations.

First Embodiment

FIG. 1 illustrates an optical receiver 10 according to the first embodiment of the invention. The optical receiver 10 comprises an avalanche photodiode (APD) 1, a voltage source 2, a power supply 6, a controller 4, a voltage divider 3, a reference generator 5, and an amplifier 7. The APD 1 converts an optical signal to an electrical signal. The voltage source 2 supplies a bias voltage to the APD 1. The controller 4 controls the voltage source 2. The amplifier amplifies the electrical signal converted by the APD 1.

An input terminal 21 of the voltage source 2 is connected to the power supply 6 while an output terminal 22 is coupled to the APD 1, thereby the bias voltage is supplied to the APD 1. An input terminal 31 of the voltage divider 3 is connected to the output terminal 22 of the voltage source, while an output terminal 32 thereof is coupled to a first input terminal 41 of the controller 4.

The reference generator 5 comprises a temperature sensor 55, a register 56 and a digital-to-analog converter (DAC) 57, which outputs specific reference voltage to a second input terminal of the controller. In the register 56, reference voltages indexed to temperatures are precedently stored in a digital form. The specific level corresponding to a temperature monitored by the temperature sensor 56 is converted to an analog form by the DAC 57, and is output from the output terminal 51. The DAC in the present embodiment has an 8-bit accuracy, which outputs 2.5V for a digital input of Rg=0, while it outputs 1.5V for a digital input of Rg=255. Reference voltages stored in the register 56 are set so that the voltage source 2 provides the bias voltage to the APD1 to keep a multiplication factor of the APD 1 to be constant against temperatures. The output terminal 51 of the reference generator 5 is connected to the second input terminal 42 of the controller, hence the specific voltage generated in the reference generator is compared to the output of the voltage divider 3. The reference generator 5 preferably has a digital interface to set reference voltages into the register 52, thereby adjustment of reference voltages to respective photodiodes can be performed.

The controller 4 compares a voltage inputted into the first input terminal 41 to that inputted into the second input terminal 42 and outputs a compared result to the voltage source 2. Namely, when the input voltage to the first terminal 41 is lower than that inputted into the second terminal 42, the result thereof increases. On the other hand, the voltage of the first input terminal 41 is higher than that of the second input terminal 42, the controller controls the voltage source so that the output thereof decreases.

Accordingly, the optical receiver illustrated in FIG. 1 performs a feed-back control that the bias voltage to the APD 1 output from the voltage source 2 is monitored by the voltage divider 3, the divided voltage is inputted to the controller 4, which is compared to the reference level, and the controller controls the voltage source based on this comparison.

The voltage divider 3 comprises a first resistor 3b and a second resistor 3a connected in serial to the first resistor 3b. The first resistor 3b is connected to the input terminal 31, which is coupled to the output 22 of the voltage source 2, while the second resistor 3a is grounded. A node common to the first resistor 3a and the second resistor 3a is guided to the output terminal 32 of the voltage divider 3 that is coupled to the first input terminal 41 of the controller 4. An exemplary resistance is 620 kΩ and 20 kΩ for the first resistor 3b and the second resistor 3a, respectively.

Next, a manufacturing method of the optical receiver will be described, especially a method for setting reference voltages to temperatures in the register 56.

The first method is that the optical receiver detects an optical signal with a predetermined optical power level. Subsequently, the temperature of the APD 1 is changed with keeping the output of the APD 1 to be constant by varying the bias voltage. The reference voltage output from the reference generator 5 and inputted to the second input terminal of the controller adjusts the bias voltage. One typical condition for setting the reference voltage is that the reference voltage is adjusted so that the output of the APD 1 is 13 µA for the optical input optical power of −28 dBm at temperatures 70° C. and −5° C.

Next, a function that approximates reference voltages at optional temperatures from measured reference voltages is calculated. For example, when the bias voltage and the reference voltage are 62.9V and 1.967V (Rg=136 in digital form) at 75° C., and 55.5V and 1.735V (Rg=195), respectively, the following function may be obtained by the first approximation;

$$Rg=191.09-0.787*T.$$

Based on the function thus obtained, reference voltages at an interval of 4° C. within the range from −40° C. to 90° C. are calculated. Although only two points of temperatures are selected in the above explanation, further precise function may be obtained by increasing the point of temperature at which the reference voltages are practically measured.

The second method for precedently setting reference voltages is based on the characteristic of the APD 1 itself. One example is considered that the applied bias voltage to the APD 1 to keep the output current of 13 µA for the optical input power of −28 dBm is characterized by the following relation:

$$V_{apd}=56.0+0.1*T, \quad (1)$$

where T is the junction temperature of the APD in the unit of centigrade.

In FIG. 1, the bias voltage applied to the APD 1 is calculated as, $$V_{apd}=V_{ref}*(R_{3a}+R_{3b})/R_{3a}, \quad (2)$$

$$V_{ref}=2.5-R_g/255, \quad (3)$$

where $V_{apd}$ is the bias voltage applied to the APD 1 and $V_{ref}$ is the reference voltage output from the reference generator 5. From Eq. (1) to Eq. (3), registered value Rg at the optional temperature are calculated as follows;

$$Rg=191.25-0.797*T,$$

where T is the junction temperature of the APD 1. Based on thus calculated equation, reference voltages to be stored in the register with an interval of 4° C. in temperatures from −40° C. to 90° C. can be calculated.

The optical receiver 10 of the present embodiment has the voltage divider 3 and the controller 4 that controls the voltage source 2 based on the comparison of the output from the voltage divider 3 to the reference voltage from the reference generator 5. The reference generator 5 outputs the reference voltage by monitoring the temperature of the APD 1 and retrieving from the register the reference level in a digital form corresponding to the monitored temperature. Consequently, the bias voltage supplied to the APD 1 can be adjusted so as to keep the multiplication factor of the APD 1 to temperatures.

In the embodiment thus described, the DAC 57 includes the temperature sensor. However, it may be applicable that the temperature sensor is independent of DAC 57 and the information sensed by the temperature sensor is transmitted to the DAC 57.

Second Embodiment

Figure 2:
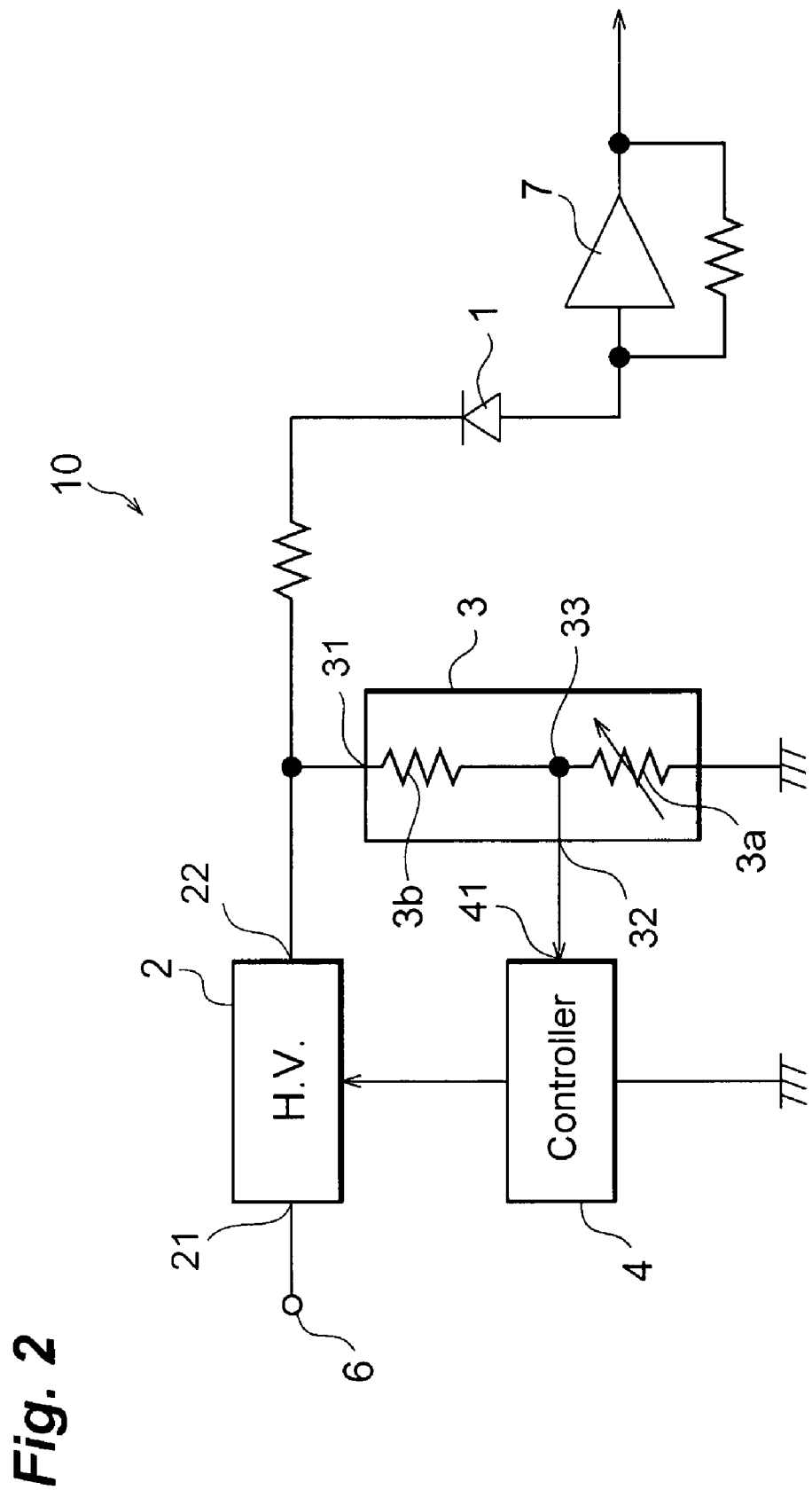
FIG. 2 shows a block diagram of the optical receiver according to the second embodiment of the invention.

FIG. 2 illustrates a second embodiment of the present invention. Similar to the first embodiment, the optical receiver 10 according to the second embodiment comprises an APD 1, a voltage source 2, a power supply 6, a controller 4, a voltage divider 3, and an amplifier 7. The voltage divider 3 monitors the output of the voltage source 2. The controller 4 controls the voltage source 2 based on the output of the voltage divider 3.

The input terminal 21 of the voltage source couples to the power supply, while the output terminal 22 couples to the APD 1 for supplying the bias voltage thereto. The input terminal 31 of the voltage divider 3 couples to the output of the voltage source 2, and the output thereof is connected to the controller 4.

The controller 4 compares the output from the voltage divider 3 to a reference voltage, and controls the voltage source 2 based on the comparison. Namely, in the case that the output from the voltage divider 3 is smaller than the reference voltage, the controller controls the voltage source so as to raise the output thereof. On the other hand, when the output of the voltage divider is greater than the reference voltage, then the controller 4 decreases the output of the voltage source 2. Furthermore, the reference voltage may be generated within the controller 4 or may be provided from the outside.

Thus, a control of the feedback loop can be performed, in which the output of the voltage source 2 is sensed by the voltage divider and the controller 4 controls the output of the voltage source 2 according to the comparison of the output of the voltage divider to a reference voltage.

The voltage divider 3 comprises a resistor 3b and a variable resistor 3a serially connected to the resistor 3b. The variable resistor 3a has a configuration that the resistance thereof can be varied in digital form. One terminal of the resistor 3b is coupled to the output terminal 22 of the voltage source, while one terminal of the variable resistor 3a is grounded. A node 33 that connects the resistor 3b to the variable resistor 3a is connected to the output terminal 32 of the voltage divider that is guided to the input terminal 41 of the controller 4. By varying the resistance of the variable resistor 3a, which changes the dividing ratio of the voltage divider 3, an input level of the controller 4 can be adjusted, whereby the bias voltage to the APD 1 can be varied through thus described feedback loop. When the resistance of the variable resistor 3a decreases, the bias provided to the APD 1 increases. On the other hand, the resistance of the resistor 3a increases, the controller 4 controls the voltage source 2 so as to increase its output.

Figure 3:
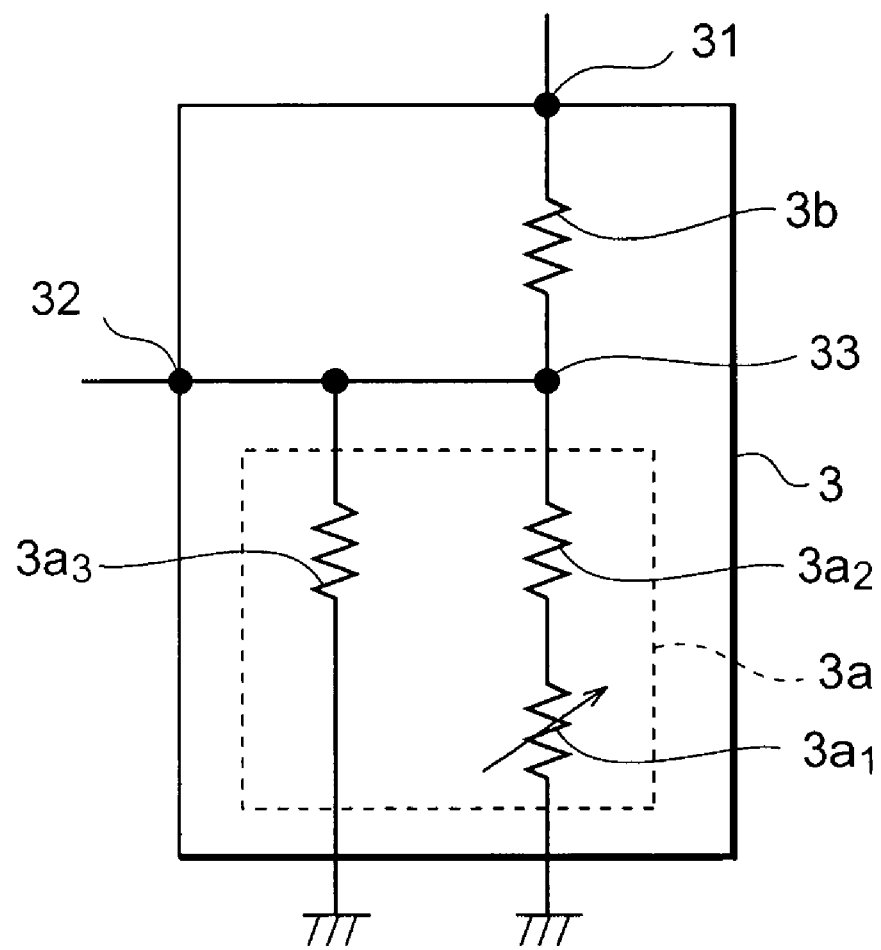
FIG. 3 is a detailed configuration of the variable resistor.

FIG. 3 is a detailed configuration of the variable resistor 3a. The variable resistor 3a comprises a digitally variable resistor $3a_1$, a first resistor $3a_2$, serially connected to the digitally variable resistor $3a_1$, and another resistor $3a_3$ connected in parallel to the digitally variable resistor $3a_1$ and the first resistor $3a_2$. By the configuration shown in FIG. 3, the resistance of the variable resistor 3a can be adjusted in a desired range. The digitally variable resistor $3a_1$ may include a temperature sensor for monitoring a temperature of the APD 1 and a register including a reference table that relates temperatures thereof with corresponding resistance values. The temperature sensor and the register are not shown in FIG. 3. The resistance values stored in the register are the value by which the controller 4 controls the voltage source so that the multiplication factor of the APD 1 is constant. In the present embodiment, the digitally variable resistor is a type of 10 kΩ controlled by 8-bit digital signal varying from 0 to 255. When the digital signal is 0, the resistance thereof is 0Ω, and the resistance of 10 k Ω corresponds to digital signal of 255. Thus, the digitally variable resistor $3a_1$ provides a specific resistance by retrieving from the reference table based on the monitored temperature. The digitally variable resistor $3a_1$ also includes a digital interface to set and to modify resistance values and temperatures stored in the register.

Next, two methods for setting the resistance values stored into the register will be described.

First, similar to the method described in the first embodiment, the optical receiver 10 receives an optical signal with a predetermined optical power level. Subsequently, the temperature of the APD 1 is changed as the output from the APD 1 is kept constant with adjusting the bias voltage supplied to the APD 1. The adjusting of the bias voltage is performed by changing the resistance of the variable resistor 3a. One example is that the optical input power to the APD 1 is kept constant to be −28 dBm, and the bias voltage of the APD 1 is so adjusted that the output photo current therefrom is kept constant to be 13 μA for temperatures −5° C., 25° C. and 70° C. The resistances of the digitally variable resister $3a_1$ are measure in the condition above described and the digital values thus measured are stored in the register. In the present embodiment, the resistances of the resistor $3a2$, $3a3$ and $3b$ are 12 kΩ, 82 kΩ, and 820 kΩ, respectively.

Next, a function that approximates resistance values at optional temperatures from measured resistance values is calculated. For example, when the values of the digitally valuable resistor $3a1$ are 3.3 kΩ (registered value Rg=85) at the temperature 70° C., 4.9 kΩ (Rg=125), and 6.2 kΩ (Rg=157), respectively, the function that approximates the relation between the temperature and the registered value Rg is defined by:

$$Rg=151.37-1.11*T+0.024*T^2.$$

Based on the function thus obtained, resistance values of the digitally variable resistor 3a, are calculated at 2° C. interval within the range from −40° C. to 95° C. Although only three points of temperatures are selected in the present explanation, further precise function may be obtained by increasing the temperature at which the resistance values are practically measured.

The fourth method is based on the characteristic of the APD 1 itself, which is similar to the second method described in the first embodiment. An APD 1 is approximated that the temperature dependence of the bias voltage obeys the next relation to keep the photo current to be 13 μA for the optical signal of −28 dBm, $$V_{apd}=56.0+0.1*T, \qquad (4)$$

where T is the junction temperature of the APD in the unit of centigrade.

Assuming that the resistance of resistors $3b$, $3a_2$ and $3a_3$ are 820 kΩ, 12 kΩ and 82 kΩ, respectively, the bias voltage supplied to the APD 1 is:

$$V_{apd}=(R_{3b}+((R_{3a2}+R_{3a1})//R_{3a2}))*V_0/((R_{3a2}+R_{3a1})//R_{3a2}) \qquad (5)$$

where $V_0$ is the voltage at the input terminal of the controller and "A//B" denotes the combined resistance of the resistor A and B connected in parallel.

From equations Eq. (4) and Eq. (5), the relation between the temperature and the resistance $R_{3a1}$ of the digitally variable resistor $3a_1$ are calculated as follows:

$$56.0+0.1*T=(R_{3b}+((R_{3a2}+R_{3a1})//R_{3a3}))*V_0/((R_{3a2}+R_{3a1})//R_{3a3}).$$

Assuming that $V_0$=1.0 [V] and inserting values for respective resistors, a function that approximates a behavior of the digitally variable resistor to temperatures is obtained as follows:

$$Rg = 151.34 - 1.12*T + 0.00251*T^2.$$

Based on the function thus obtained, resistance values of the digitally variable resistor $3a_1$ are calculated at 2° C. interval within the range from −40° C. to 95° C.

The optical receiver 10 according to the present embodiment, which comprises the voltage source 2, the voltage divider 3 for dividing the output of the voltage source 2 and the controller 4 for controlling the voltage source 2 based on the output of the voltage divider 3. Moreover, the voltage divider 3 has the variable resistor 3a, the resistance of which can be adjusted in accordance with the temperature monitored by the temperature sensor included in the resistor 3a. Consequently, the resistance of the variable resistor is changed in accordance with the temperature, thereby the input to the controller 4, which is the output of the voltage divider 3, can be varied as the temperature changes. Therefore, the bias voltage supplied to the APD 1, which is the output from the voltage source 2, can be adjusted as the temperature changes, the multiplication factor of the APD 1 can be kept constant independent of the temperature.

Thus, the optical receivers having the function that the multiplication factor of the APD can be maintained independent of temperatures are illustrated. However, the function of the present invention is not restricted to those optical receivers described in embodiments. Optical transceivers, in which not only an optical receiver but also an optical transmitter are installed and perform the full duplex communication, can use the present invention.

What is claimed is:

1. An optical receiver, comprising:
    an avalanche photodiode having a multiplication factor;
    a voltage source for supplying a bias voltage to the avalanche photodiode;
    a temperature sensor for monitoring a temperature of the avalanche photodiode;
    a controller for controlling the voltage source; and
    a reference generator including a register and a digital-to-analog converter, the register storing a relation between a reference voltage and the temperature of the avalanche photodiode in a digital form, the reference generator being configured to retrieve the reference voltage stored in the register by indexing the temperature of the avalanche photodiode and to output the retrieved reference voltage to the controller in an analog form by converting with the digital-to-analog converter,
    wherein the multiplication factor of the avalanche photodiode is kept substantially constant by adjusting the bias voltage to the avalanche photodiode based on the temperature monitored by the temperature sensor.

2. The optical receiver according to claim 1, wherein the reference generator further includes a digital interface for setting the reference voltage and the temperature of the avalanche photodiode in the register.

3. An optical receiver with a function to control a multiplication factor of an avalanche photodiode to be substantially independent of a temperature of the avalanche photodiode, comprising:
    a voltage source for supplying a bias voltage to the avalanche photodiode;
    a temperature sensor for monitoring a temperature of the avalanche photodiode;
    a controller for controlling the voltage source; and
    a voltage divider configured to divide the bias voltage output from the voltage source and to output a divided voltage to the controller,
    wherein the voltage divider includes a variable resistor having a resistance controlled by the temperature sensor.

4. The optical receiver according to claim 3, wherein the temperature sensor is integrated in the variable resistor.

5. The optical receiver according to claim 3, wherein the variable resistor further includes a register for storing resistance values corresponding to temperatures, the variable resistor retrieving a resistance value from the register based on the temperature monitored by the temperature sensor.

6. A method for manufacturing an optical receiver including an avalanche photodiode having a multiplication factor, a temperature sensor for monitoring temperatures, a voltage source for supplying a bias voltage to the avalanche photodiode, a controller for controlling the bias voltage and a reference generator for providing a reference voltage based on the temperature monitored by the temperature sensor to the controller, the controller controlling the voltage source based on the comparison of the bias voltage with the reference voltage so as to maintain the multiplication factor of the avalanche photodiode substantially constant with respect to temperatures, the method comprising the steps of:
    measuring reference voltages in at least two specific temperatures different to each other so as to maintain an output of the avalanche photodiode substantially constant; and
    calculating reference voltages corresponding to temperatures except for the specific temperature based on the measured reference voltage.

7. The method for manufacturing the optical receiver according to claim 6, wherein the optical receiver further includes a register for storing data that relates the reference voltage to the temperature,
    and the method further comprising the steps, after the calculation of the reference voltages, of setting the measured reference voltages and the calculated reference voltage with corresponding temperatures into the register.

8. The method for manufacturing the optical receiver according to claim 7, wherein the register and the temperature sensor are integrated in the reference generator.

9. A method for manufacturing an optical receiver including an avalanche photodiode having a multiplication factor, a temperature sensor for monitoring temperatures, a voltage source for supplying a bias voltage to the avalanche photodiode, a controller for controlling the bias voltage and a voltage divider configured to divide the bias voltage based on the temperature monitored by the temperature sensor and to provide the divided voltage to the controller, the controller controlling the voltage source so as to maintain the multiplication factor of the avalanche photodiode substantially constant to temperatures, the method comprising the steps of:
    measuring resistance values of the variable resistor in at least two specific temperatures different from each other so as to maintain an output of the avalanche photodiode substantially constant to the temperature; and
    calculating resistance values corresponding to temperatures except for the specific temperature based on the measured resistance value of the variable resistor.

10. The method for manufacturing the optical receiver according to claim 9, wherein the optical receiver further includes a register for storing resistance values of the variable resistor and the corresponding temperatures, and the method further comprising the steps after the calculation of the resistance values, setting the measured resistance values and the calculated resistance values with corresponding temperatures into the register.

11. The method for manufacturing the optical receiver according to claim 9, wherein the register and the temperature sensor are integrated in the variable resistor.

12. The optical receiver according to claim 3, further comprising:

a reference generator for outputting a reference voltage to the controller, wherein the controller controls the voltage source based on a comparison of the reference voltage with the divided voltage output from the voltage divider.

13. The optical receiver according to claim 3, wherein the variable resistor is a digitally variable resistor.

14. The optical receiver according to claim 13, wherein the voltage divider further includes a first resistor serially connected to the digitally variable resistor and a second resistor connected in parallel to the digitally variable resistor and the first resistor.

* * * * *